US012256293B2

(12) United States Patent
Todd et al.

(10) Patent No.: US 12,256,293 B2
(45) Date of Patent: Mar. 18, 2025

(54) INCREASING DEVICE DATA CONFIDENCE AND OPERATION VIA TEMPORAL AND SPATIAL ANALYTICS

(71) Applicant: EMC IP Holding Company LLC, Hopkinton, MA (US)

(72) Inventors: Stephen J. Todd, Center Conway, NH (US); Marina Levina, Newton, MA (US); Jason A. Shepherd, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 196 days.

(21) Appl. No.: 16/834,486

(22) Filed: Mar. 30, 2020

(65) Prior Publication Data

US 2021/0306819 A1 Sep. 30, 2021

(51) Int. Cl.
*H04W 4/38* (2018.01)
*G16Y 20/10* (2020.01)
*G16Y 30/10* (2020.01)
*G16Y 40/10* (2020.01)
*H04W 4/80* (2018.01)

(52) U.S. Cl.
CPC .............. *H04W 4/38* (2018.02); *G16Y 20/10* (2020.01); *G16Y 30/10* (2020.01); *G16Y 40/10* (2020.01); *H04W 4/80* (2018.02)

(58) Field of Classification Search
CPC ........ G16Y 20/10; G16Y 30/10; G16Y 40/10; H04W 4/38; H04W 4/80; H04L 67/12
See application file for complete search history.

(56) References Cited

U.S. PATENT DOCUMENTS

| | | | |
|---|---|---|---|
| 9,852,388 B1* | 12/2017 | Swieter | G06Q 10/06313 |
| 2007/0241864 A1* | 10/2007 | Nagai | G06K 7/0008 |
| | | | 340/8.1 |
| 2011/0055897 A1* | 3/2011 | Arasaratnam | G06F 21/6218 |
| | | | 726/3 |
| 2015/0058278 A1* | 2/2015 | Fankhauser | G06F 16/2365 |
| | | | 707/602 |
| 2015/0156185 A1* | 6/2015 | Arunkumar | H04L 63/105 |
| | | | 726/4 |
| 2017/0332049 A1* | 11/2017 | Zhang | H04W 4/38 |
| 2017/0347979 A1* | 12/2017 | Fehre | A61B 6/4441 |
| 2018/0283913 A1* | 10/2018 | Chen | A61B 5/6833 |

(Continued)

OTHER PUBLICATIONS

Welch, P., "The Use of Fast Fourier Transformation for the Estimation of Power Spectra: A Method Based on Time Averaging Over Short, Modified Periodograms", IEEE Transactions on Audio and Electroacoustics, Jun. 1, 1967 https://pdfs.semanticscholar.org/e633/45b4243e2376720a4e66373fdffe7a7d6be0.pdf.

(Continued)

*Primary Examiner* — Jason D Recek
(74) *Attorney, Agent, or Firm* — Workman Nydegger

(57) ABSTRACT

One example method includes determining a spatial distribution of devices in a three dimensional physical environment, determining a polling frequency for each of the devices, receiving data generated by the devices, evaluating the data, and assigning a trust score to the data. The devices may take the form of respective sensors operable to sense a physical attribute of the three dimensional physical environment. A Fourier transform may be employed to determine the polling frequency.

16 Claims, 10 Drawing Sheets

(56) References Cited

U.S. PATENT DOCUMENTS

| | | | | |
|---|---|---|---|---|
| 2018/0352386 | A1* | 12/2018 | Gunasekara | H04W 4/33 |
| 2020/0003652 | A1* | 1/2020 | Lansey | G01M 3/2815 |
| 2020/0217666 | A1* | 7/2020 | Zhang | G01S 5/0252 |
| 2021/0117563 | A1* | 4/2021 | Moresmau | G06F 21/6218 |
| 2021/0258258 | A1* | 8/2021 | Takagi | H04L 47/28 |
| 2023/0033951 | A1* | 2/2023 | Karagiannis | G06F 1/1626 |

OTHER PUBLICATIONS

Derpanis, "Fourier Transform of the Gaussian", Oct. 20, 2005.
"IEEE 1451", Wikipedia, retrieved as early as Sep. 18, 2019, https://en.wikipedia.org/w/index.php?title=IEEE_1451&oldid=1242613150.
"68-95-99.7 Rule", Wikipedia, retrieved as early as Sep. 18, 2019, https://en.wikipedia.org/w/index.php?title=68-95-99.7_rule&oldid=1230605986.
Gallager, "Stochastic Processes Theory for Applications", Cambridge University Press, 2013.
"Three Sigma Limits And Control Charts", SPC for Excel, Jul. 2017, https://www.spcforexcel.com/knowledge/control-chart-basics/three-sigma-limits-control-charts.
"Parseval's Theorem", Wikipedia, retrieved as early as Sep. 18, 2019, https://en.wikipedia.org/wiki/Parseval%27s_theorem.
"Nyquist-Shannon Sampling Theorem", Wikipedia, retrieved as early as Sep. 18, 2019, https://en.wikipedia.org/wiki/Nyquist%E2%80%93Shannon_sampling_theorem.
Derler et al., "Ptides: A Programming Model for Distributed Real-Time Embedded Systems", EECS Berkeley, May 28, 2008, https://www2.eecs.berkeley.edu/Pubs/TechRpts/2008/EECS-2008-72.pdf.
Giaralis, "Lecture Series: Stochastic Dynamics and Monte Carlo simulation in earthquake engineering applications", Sapienza University of Rome, Jul. 13, 2017.

* cited by examiner

INCREASING DEVICE DATA CONFIDENCE AND OPERATION VIA TEMPORAL AND SPATIAL ANALYTICS

FIELD OF THE INVENTION

Embodiments of the present invention generally relate to data confidence. More particularly, at least some embodiments of the invention relate to systems, hardware, software, computer-readable media, and methods for using temporal and spatial analytics to improve data confidence scores.

BACKGROUND

The effectiveness of an array of sensors can be considered at least in part in terms of the trustworthiness of the sensor readings, that is, the confidence that the sensor readings accurately reflect conditions in the environment that is being monitored by the sensors. However, it may be difficult to determine whether or not a sensor is operating properly.

For example, even if a sensor provides an erroneous reading, that is, a reading that does not accurately reflect actual conditions, that reading may still, in the absence of contrary data, be considered to be accurate if it is within a range specified by the sensor manufacturer. As another example, a sensor may provide readings within a specified range, but if the polling frequency of the sensor is not set correctly, the readings may not be accurate. In another example, if enough sensor data is not collected, it may be difficult or impossible to determine if a sensor, or group of sensors, is providing accurate data. In a further example, if a sensor cannot be baselined in some manner, in may be difficult or impossible to determine whether the data provided by the sensor is accurate or not. Finally, if an environment includes too few sensors, then there may not be enough data to enable a determination as to whether or not the gathered data is accurate. On the other hand, if an environment includes more sensors than are needed for data accuracy determinations, the enterprise may be wasting money, power, computing resources, and labor, in the installation, use, polling, and maintenance of those sensors.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
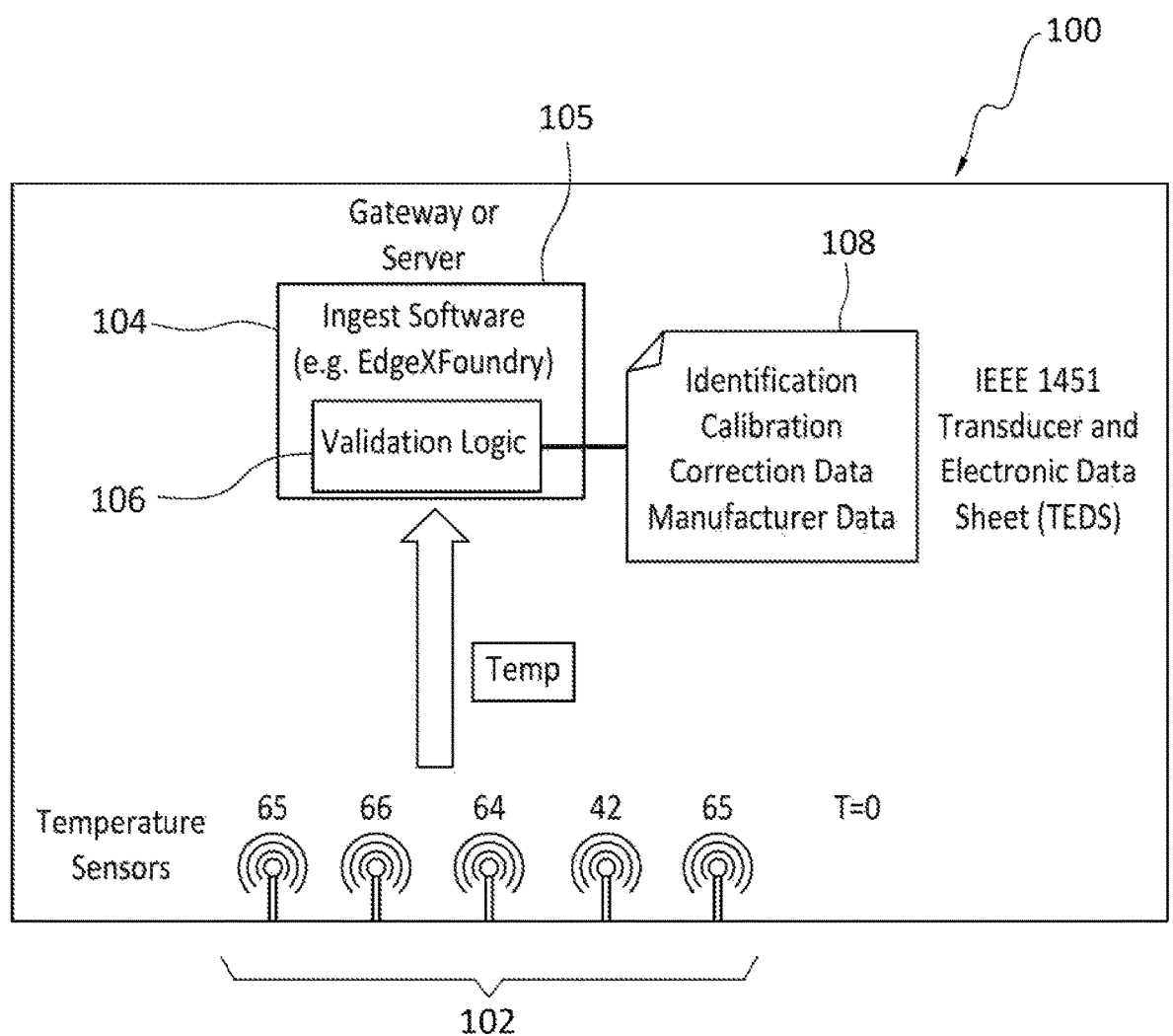
FIG. 1 discloses aspects of an example operating environment.

Embodiments of the present invention generally relate to data confidence. More particularly, at least some embodiments of the invention relate to systems, hardware, software, computer-readable media, and methods for using temporal and spatial analytics to improve data confidence scores.

In general, example embodiments of the invention involve the use of data concerning devices such as sensors, including the distance from a sensor to an ingest platform, to aid in optimizing various parameters including, but not limited to, polling frequency, the number of devices deployed in an environment, and accuracy of the device readings. At least some embodiments comprise one or more algorithms that implement a Fourier transform in optimization processes for these and/or other parameters. These and/or other embodiments may determine a data confidence score for data generated by one or more devices, so to enable better decisions to be made based on the data. Embodiments of the invention may be implemented in various environments, including a data confidence fabric (DCF). Example DCF environments may comprise, or consist of, a data ingestion platform or, more simply, an ingestion platform.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that confidence in data obtained by one or more devices may be improved. An embodiment of the invention may provide for determining an optimal number of devices, such as sensors for example, to be employed in a particular environment. An embodiment of the invention may help to optimize polling frequency of a device, or devices. An embodiment of the invention may help to reduce the costs associated with implementation and use of a device array. An embodiment of the invention may help to identify erroneous, in-range, readings generated by a device such as a sensor. An embodiment of the invention may provide for adequate storage/bandwidth to support collection and analysis of data sets whose size is statistically significant. An embodiment of the invention may enable device-to-device comparisons for evaluating performance of a device.

A. ASPECTS OF AN EXAMPLE ARCHITECTURE AND ENVIRONMENT

The following is a discussion of aspects of example operating environments for various embodiments of the invention. This discussion is not intended to limit the scope of the invention, or the applicability of the embodiments, in any way.

Figure 2:
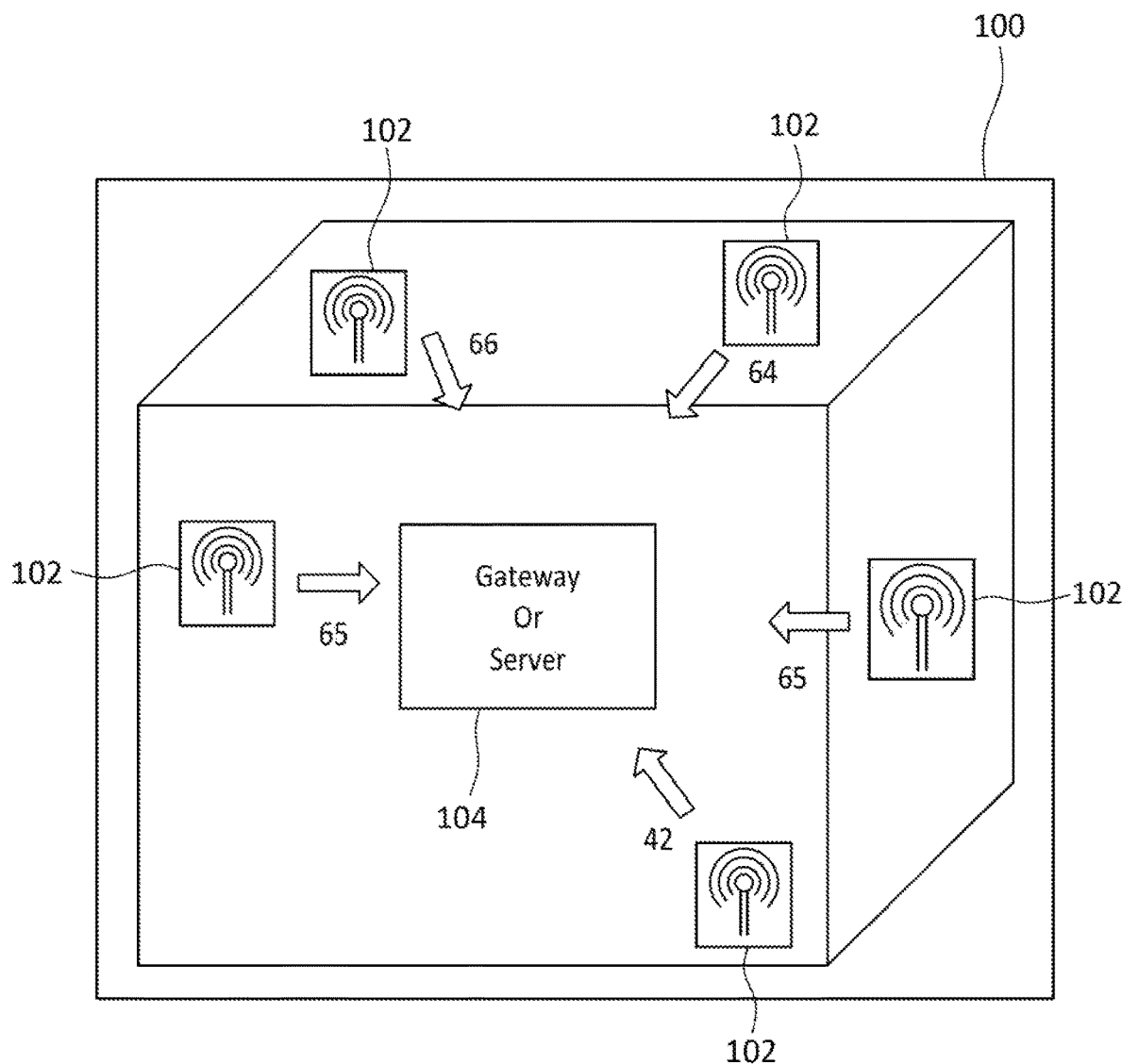
FIG. 2 discloses further aspects of an example operating environment.
Figure 3:
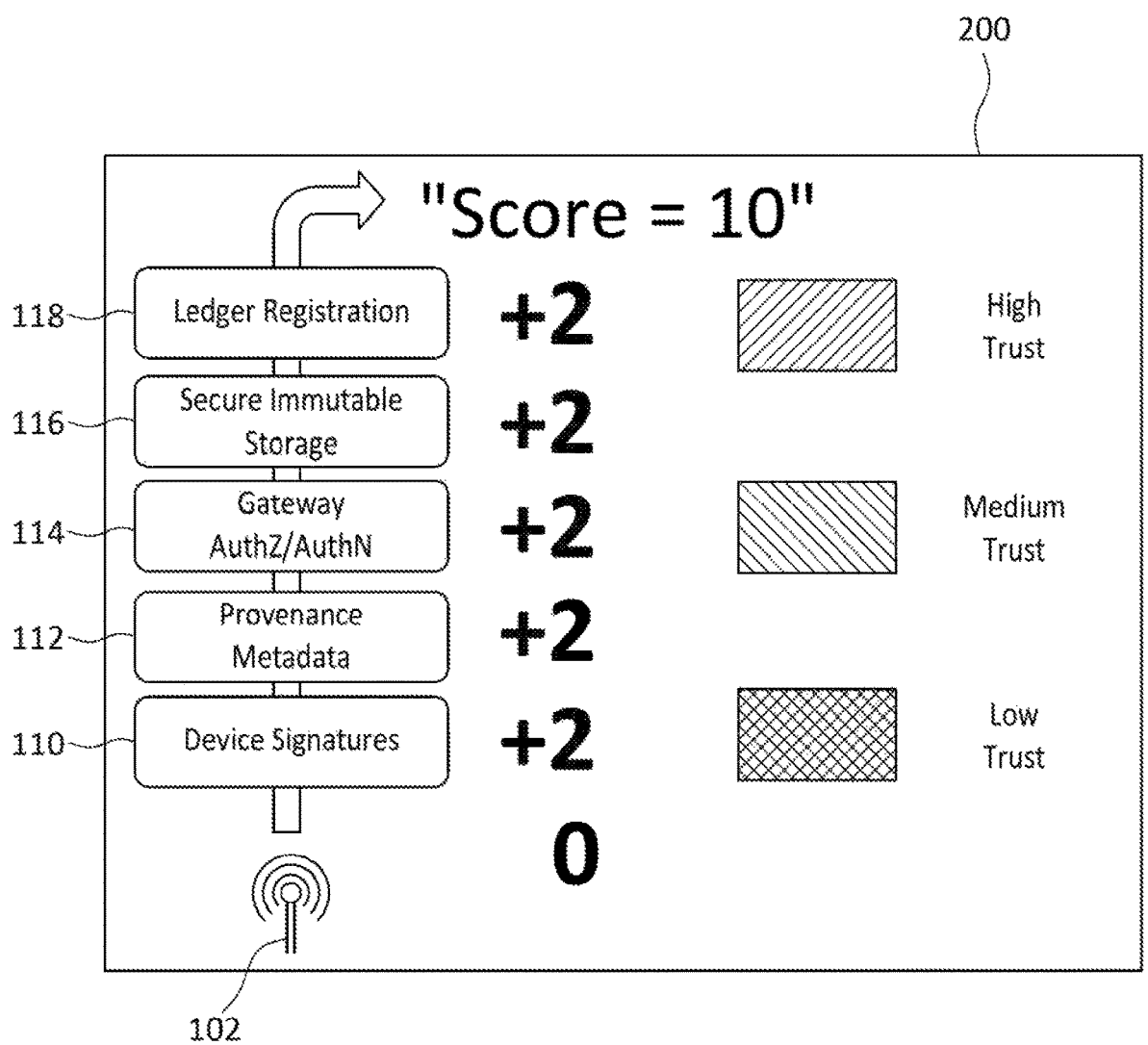
FIG. 3 discloses aspects of a example trust insertion technologies.

With particular reference to FIGS. 1-3, details are provided concerning aspects of some example operating environments. One example operating environment is generally referred to at 100. The operating environment 100 may be any environment, that includes one or more devices 102, which may each comprise hardware and/or software, that are operable to generate and/or collect data concerning one or more aspects of the operating environment 100. For example, the operating environment 100 may have attributes of a computing environment and/or attributes of a physical environment. In any case, the scope of the invention is not limited to the example operating environments 100 disclosed herein.

In some embodiments, the operating environment 100 has one or more physical attributes that may be monitored by the devices 102. As such, one or more of the devices 102 may comprise one or more sensors that may be configured to sense one or more physical attributes, which may include, but are not limited to, temperature, pressure, humidity, light, odors, and sound. The sensors may assign a value to a particular detected physical attribute. For example, and with reference to FIG. 1, the devices 102 may each comprise, or consist of, a temperature sensor that may report a temperature detected by that temperature sensor, such as 65F for example. Any number, type, and combination, of devices 102 may be employed in an operating environment 100. For example, a pressure sensor, a humidity sensor, and a noise sensor may all be employed in a single operating environment 100. The scope of the invention is not limited to any type, number, or mix, of devices 102 or sensors.

As shown in the example of FIG. 1, the devices 102 may each report, on a periodic or other basis, data to a collection point 104, such as a gateway or server for example. The collection point 104 may be running ingestion software 105, such as EdgeXFoundry for example, that may process and manage the incoming data from the devices 102. As well, the collection point 104 may include validation logic 106 that, in general, may inspect the incoming data received from the devices 102, and then compare that data to, for example, information 108 concerning the device 102, such as a set of manufacturer specifications, or standards, for example. In the particular example of FIG. 1, the information 108 comprises technical information such as the Institute of Electrical and Electronics Engineers (IEEE) 1451 standards for smart transducer interfaces. Thus, the validation logic 106 may consult an electronic form of the IEEE 1451 data sheet for the specific device 102, such as a temperature sensor, from which the data was received, and the validation logic may then use the information 108 to determine whether or not data received from the device 102 is out of range.

If all of the readings received from the devices 102 are in a range specified by a manufacturer or standard for example, the "42" reading may be marked as invalid by applying a methodology such as the three-sigma rule. Application of the three sigma rule and/or the marking may be performed, for example, by a rules engine that may constitute part of the validation logic 106, or part of another application located further up the stack indicated in FIG. 1. Note that as used herein, the three sigma (3σ) rule refers to the notion that, given a dataset, almost all data values in the dataset lie within three standard deviations of the mean value of the data in the dataset. Particularly, it is 99.7% probable that any value of the data set lies within three standard deviations of the mean value of the data in the data set. Thus, the three sigma rule may imply a high level of confidence as to a particular data value. If a data value does not pass the three sigma test, the data value may be marked as invalid.

With continued reference to FIG. 1, attention is directed now to FIG. 2 which comprises a three dimensional representation of a spatial distribution, in an example operating environment 100, of the devices 102 indicated in FIG. 1. The example operating environment 100 may thus take the form of a three dimensional space, or portion thereof. Such a three dimensional space, or volume, which can have any configuration, may be arbitrarily defined, such as by use of X, Y and Z values in an X-Y-Z coordinate system, and need not necessarily be constrained or defined by physical structures. A three dimensional space may be defined as corresponding, for example, to a room, a building, or other structure. Example three dimensional spaces includes cubes, cylinders, and non-cubic boxes that include one or more rectangular sides. More generally however, the scope of the invention is not limited to any particular three dimensional space of any particular size or configuration. Further, embodiments of the invention are not limited to any particular spatial distribution of one or more devices 102 within a particular three dimensional space, and the embodiments indicated in FIGS. 1 and 2 are provided only by way of example.

Turning now to FIG. 3, an example is disclosed of ingest software 200 importing a single reading from a device 102, and calculating a confidence, or trust, score concerning the reading as the reading eventually flows to an application. In the example of FIG. 3, the use of various trust insertion technologies is disclosed. Initially, data from the device 102 may have a default trust score of zero. As the reading, or data, from the device 102 flows along a data path, one or more of the trust insertion technologies may be used to assess the data and then assign a trust value, which may be positive or negative depending upon the outcome of the assessment, to the data based on the assessment. The assigned trust values may be summed to place the data in a continuum of Low Trust-Medium Trust-High Trust, as shown in FIG. 3.

For example, the use of device signatures 110 may enable a determination as to the owner of the device 102 and may also help to detect tampering. If the device 102 is confirmed as having the appropriate device signature 110, a score of +2 may be added to the trust score. On the other hand, if use of the device signatures 110 indicates that the owner of the device 102 could not be determined, a trust score of −1 may be assigned, for example.

Each of the trust insertion technologies may contribute a respective value, which may be positive or negative, to the overall trust score of the data from the device 102. Another example trust insertion technology is one which may assign provenance metadata 112 to the data, such as where the device 102 is located, what ingest platform first handled the data, for example. Other example trust insertion technologies include gateway authorization 114 which may indicate whether or not a client (not shown) is authorized to access data from device 102 via gateway 104. A secure immutable storage trust insertion technology 116 may assign a trust score based on where the received data has been stored so that, for example, if the data was stored in secure storage, the data may be relatively more trustworthy than data that was not stored securely. As a final example, a ledger registration trust insertion technology 118 may determine whether or not the data has been validated, such as by way of a distributed ledger for example, and then assign a trust score based on the finding.

B. FEATURES OF SOME EXAMPLE EMBODIMENTS

Embodiments of the invention may serve to implement a variety of useful features, examples of which are addressed in the following discussion with continued reference to FIGS. 1-3. For example, and with particular reference to FIG. 3, each of the trust insertion technologies may serve to protect, secure, and augment the data as the data moves along the data path to increase the overall score.

The reliability and usefulness of the trust scores assigned by those technologies may be further enhanced by providing for a validation process to verify that the data is in range and, from that perspective at least, can be trusted. This may help to avoid a situation where, if the data, or reading, cannot be trusted for some reason, the subsequent trust insertion technologies may be mis-representing the overall trustworthiness or confidence of the reading. Thus, a temperature sensor or other device might emit faulty readings that are nonetheless within a range of acceptable values specified by the manufacturer.

To illustrate with an example, suppose that one or more temperature sensors in a 65-degree Fahrenheit warehouse generates and transmits an erroneous reading of 75 degrees. This reading, or readings, could in theory be marked as "trustworthy" by a DCF and passed up to an application, which in turn might make an ill-advised business decision based on the erroneous data.

Thus, in some embodiments that involve a group of devices, such as in a room, on a floor, or in some other defined space, an example validation process may involve a comparison of the device data with readings from one or more of the other devices in the group that are measuring the same parameter(s) as the device in question. Such a comparison may help to better verify the overall trustworthiness of the data.

Some embodiments of the invention may provide for determination of an optimal polling frequency, that is, a frequency with which a device transmits data to ingest software of a collection point. Polling frequency may be expressed in terms of the number of times per second, millisecond, minute, for example, that data is transmitted by the device. If polling is performed at an appropriate frequency, such as may be enabled by embodiments of the invention, false positive indications by the validation logic, and/or other problems, may be avoided. Polling may involve pulling data from one or more devices and/or one or more devices pushing data to a data collection point.

In connection with optimized polling frequency, embodiments of the invention may correspondingly provide adequate storage, and data transmission bandwidth, necessary to support the identified polling frequency. The data transmission bandwidth may concern a data path within a collection point and/or a data transmission path between one or more devices and the collection point. Storage may be located at the collection point and/or at other locations remote from the collection point. With the ability to move or store a certain number of events, the ability to detect faulty readings may be enhanced.

Another feature of some example embodiments of the invention is that they may help to avoid under-provisioning and/or over-provisioning of devices, such as sensors for example, in an operating environment. In this regard, too many sensors, that is, a number of sensors beyond what is needed to collect a dataset having a statistically significant size, may impose unnecessary expense in time and labor on the enterprise. Too few sensors may not produce a dataset of a statistically significant size, such that the enterprise may run a risk of making decisions based on faulty and/or incomplete data.

As a final example, embodiments of the invention may operate to retain, in some instances at least, known faulty readings from devices such as sensors. This may be somewhat counterintuitive as validation logic might be expected to discard readings known to be faulty. However, it may be highly desirable instead for a reading with a low, or no, confidence score to be sent to analytic applications. This approach may allow the ingest software to indicate to the receiving application that the ingest software has forwarded a reading in which there is no confidence value. The application may process the data at its own risk or perform an analysis to determine why the low/no-confidence score(s) are appearing.

C. DEVICE POLLING FREQUENCY

Figure 4:
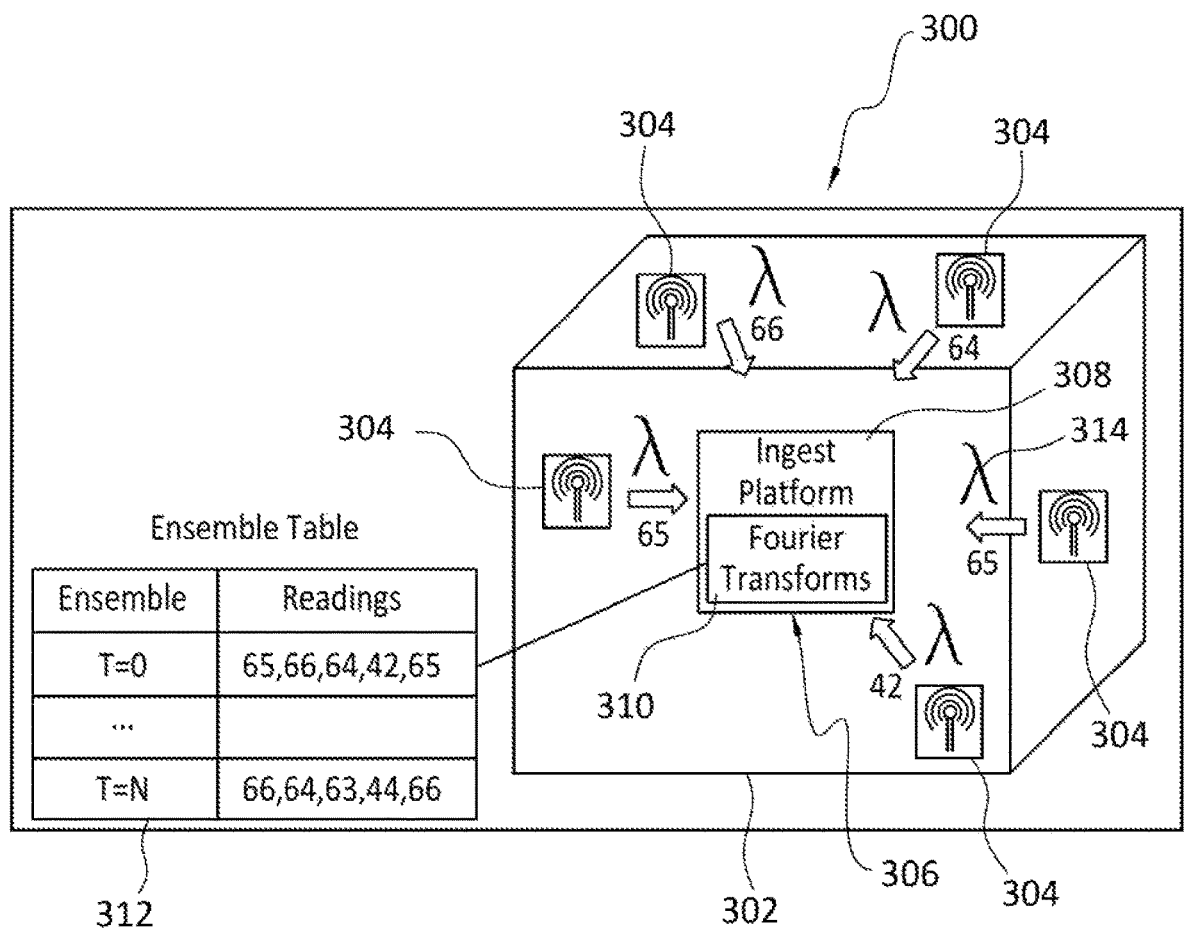
FIG. 4 discloses aspects of an example ingest platform.
Figure 5:
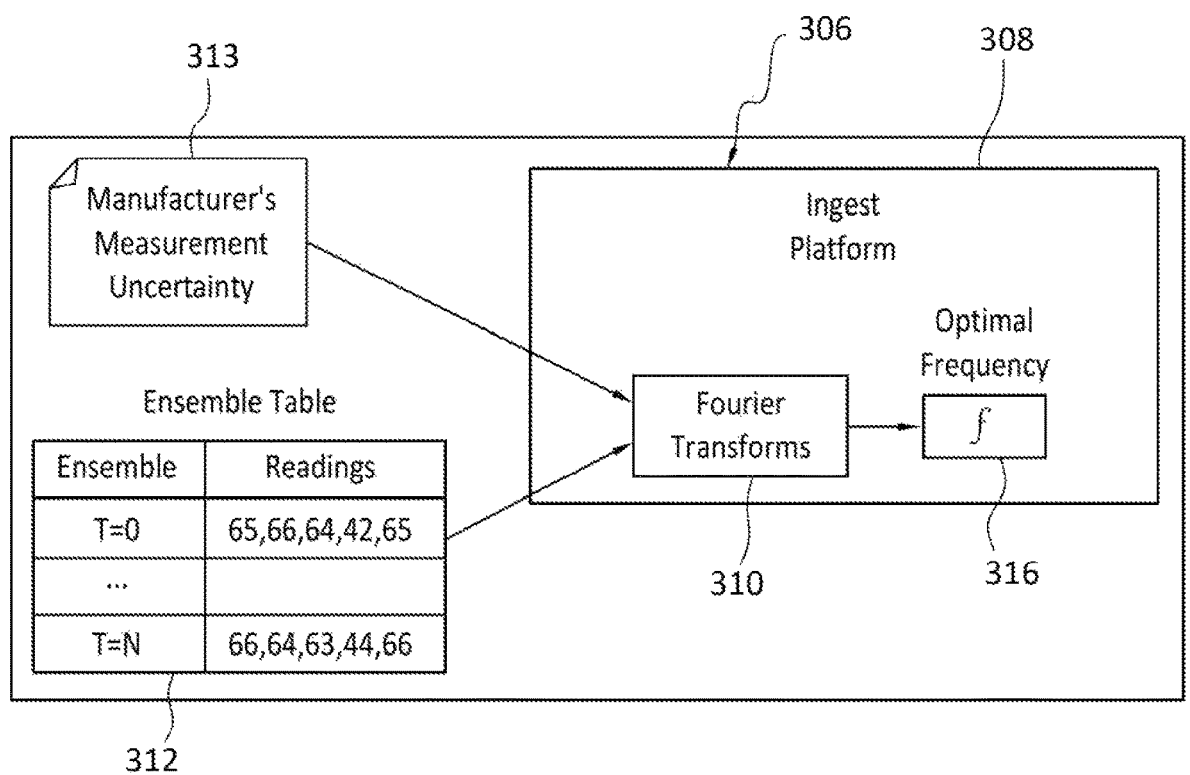
FIG. 5 discloses aspects of an example arrangement for using Fourier transforms to generate polling frequency information.

As noted earlier herein, embodiments of the invention may provide for optimization of a polling frequency for one or more devices, such as sensors for example. With reference next to FIGS. 4 and 5, details are provided concerning determination of an optimal polling frequency.

In FIG. 4, an example operating environment 300 may comprise a space 302, which may be two-dimensional, or three-dimensional, and may include one or more devices 304, such as sensors. The operating environment 300 may include a collection point 306 that comprises an ingest platform 308 for ingesting data received from the devices 304, and the ingest platform 308 may employ one or more algorithms that comprise the use of Fourier transforms 310 for determining one or more polling frequencies. As discussed in further detail elsewhere herein, the Fourier transform algorithm may help optimize polling frequency, number of devices, and accuracy of the readings.

As well, the operating environment 300, and particularly the ingest platform 308, may comprise an ensemble table 312. The ensemble table 312 includes, for each of a plurality of times T, respective readings taken by each of a plurality of devices 304 in a group of devices 304. Thus, an entry in the ensemble table 312 may take the form [time T, deviceID, reading], although other forms may alternatively be used, and the ensemble table 312 and its entries need not have any particular configuration.

In more detail, in order to determine an appropriate polling frequency to generate a "true measurement" for the environment, the ingest software may generate the ensemble table 312 and keep track of all the readings gathered from the devices 304 for each time "T." The ensemble table 312 may be stored in various ways. For example, values received from the devices 304 may be stored locally at the collection point 306 itself. As noted, in some embodiments, the collection point 306 may comprise, or consist of, a gateway. As another example, the values received from the devices 304 may be stored on an off-gateway storage system that may have more storage capacity than the gateway. It is noted that 3-sigma filtering of the data from the devices 304 may occur before the creation of any given ensemble entry. For example, device 304 measurements outside of 3-sigma may be considered as "noise" and, thus, not included in an ensemble entry. Such pre-filtering of the device 304 data may support an assumption that the ensemble table 312 contains accurate readings.

With continued reference to the example of FIG. 4, distance information (λ) 314 may be obtained that indicates a physical distance between a particular device 304 and the collection point 306, which may be a gateway that comprises, or consists of, the ingest platform 308. The physical distances may be determined in any suitable way including, but not limited to, direct measurement by user, radar, sonar, or any other distance measuring technology.

In more detail, in order to realize a minimum number of devices 304, such as sensors for example, that may be needed to generate a "true measurement" for the environment, the distance 314 from each device 304 to the ingest platform 306, such as a gateway for example, may be determined. Recording these distances 314 may be performed in any number of ways, in addition to those already noted. For example, an administrator may enter the distance values 314 into a console of the gateway, where the console may comprise, or consist of, a UI. As another example, the ingest platform 306 may interact with each device 304 to discover the distance 314 dynamically. As explained elsewhere herein, the distance information 314 may be used to determine a polling frequency for the devices 304.

Figure 6:
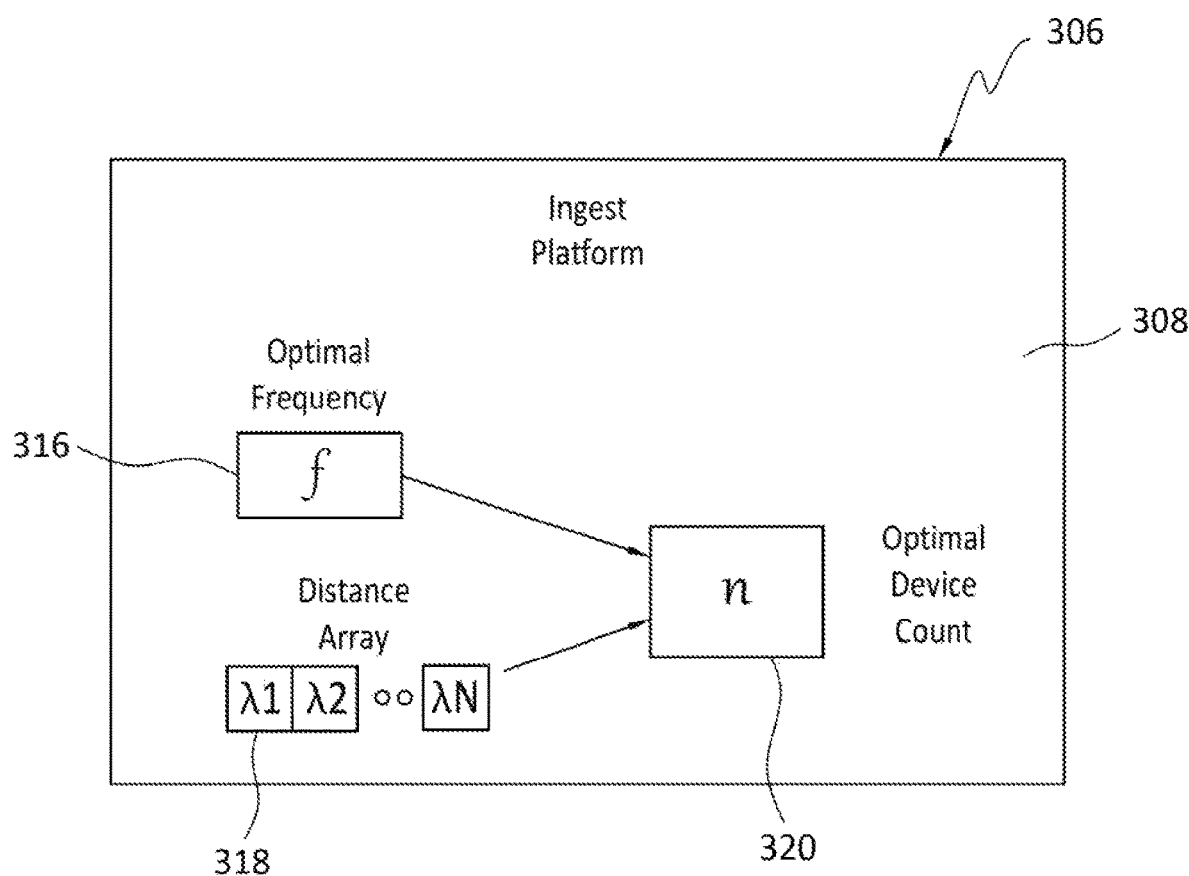
FIG. 6 discloses aspects of an example arrangement for determining an optimal device count.
Figure 7:
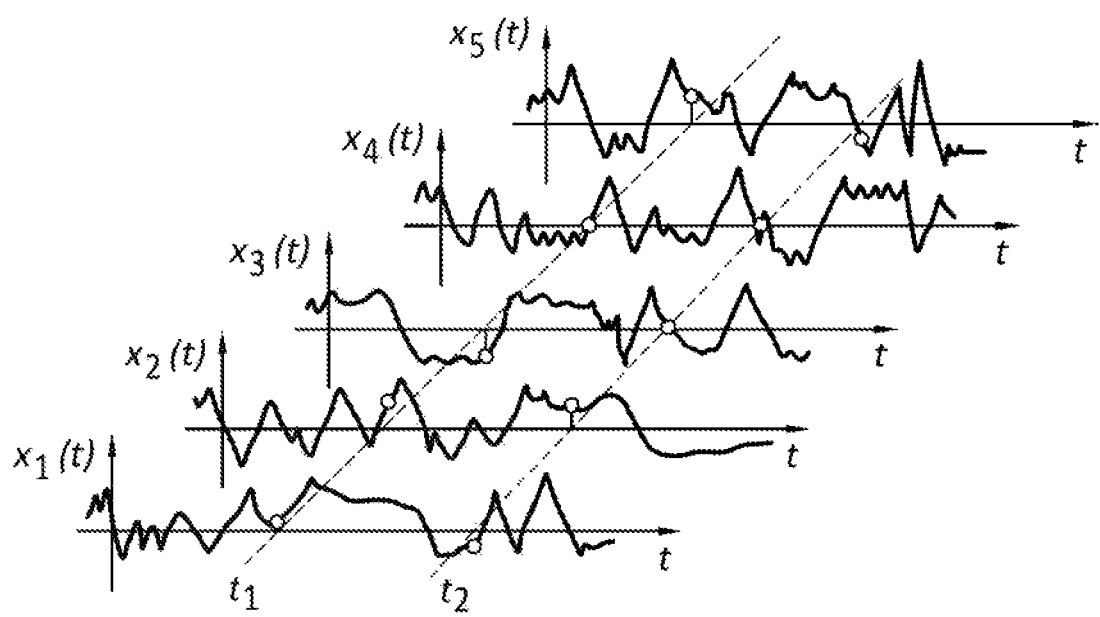
FIG. 7 discloses a mathematical ensemble view.

With reference now to FIGS. 5-7, further details are provided concerning the use, such as at the ingest platform 306, of an algorithm that may employ Fourier transforms 310 of an ensemble table 312 and manufacturer measurement uncertainty information 313 to determine an optimal polling frequency 316 for one or more devices 304. As shown in FIG. 6, the optimal polling frequency 316 may, in combination with a distance array 318, be used as a basis for determining an optimal device count 320. Note that FIG. 7 discloses an example of a mathematical ensemble view, further information concerning which is set forth in a lecture by Dr. Agathoklis Giaralis at Sapienza University of Rome. *Stochastic Dynamics and Monte Carlo simulation in Earthquake Engineering Applications*, incorporated herein by this reference: (https://www.slideshare.net/franco_bontempi_org_didattica/lecture-1-sapienza-017).

With particular reference first to FIGS. 5 and 7, an example approach to determining an optimal polling frequency is disclosed. To derive a number of measurements that may be needed for the accurate representation of the system, the approach below may be employed. It is noted that this approach assumes a continuous function for time, while a discrete function for time may imply a different approach. With regard to the continuous time function approach, the following processes may be performed.

1. Take as many device measurements as possible during the day or other specified discrete time period. The device measurements may be temperature measurements, for example.
2. Compile device measurements into realizations and look at the ensemble of measurements.
3. Take an average of the ensemble at each point (average function of the ensemble of realizations). See http://www.astro.cornell.edu/~cordes/A6523/StochasticProcesses2015.pdf.
4. After collecting ensembles, take the average of the ensembles, which may provide a more accurate representation of the realizations at each point of measurement. It may be desirable to take measurements as often as possible and then, based on their fluctuations, 'noise measurements' will be separated from the 'real' measurements by application of the 3σ rule. Note that sigma may be derived from the measurements, or may be supplied by the device manufacturer. Measurements outside the 3σ range may be considered as 'noise.'
5. The average ensemble function may then be transformed for the estimation of power spectral density using Fourier transformation. From where the amplitude of the spectrum will be derived through Parsevals' theorem (note that for the purposes of this illustrative example, $A^2$ is a function of temperature fluctuations in time):

where $S_n = A_n^2 * \sin(\omega t)$ $\omega = 2\pi f$ (where $f$ is a frequency of measurements)

6. Now the power spectral density of the average of the ensembles ($A_n^2$—a maximum temperature fluctuation in this case) may be compared with the power spectral density for the sensors' measurement uncertainty (see 313 in FIG. 5), which may be supplied by the manufacturers, or established via measurements.
7. The functional form for the measurement uncertainty of the device, such as a sensor, is following Gaussian function, which after the Fourier transformation will be a constant (also referred to as white noise):

$G(\omega) = e^{(-\omega^2 \sigma^2)/2}$ is a constant

σ standart deviation for the sensor

Intercept of the $S_n$ and $G(\omega)$ will be fs, which is a frequency of measurements that need to happen:

f=fs will be the derived frequency of measurements

8. By Nyquist's theorem (Nyquist criterion) will be derived as a frequency at which the measurements should be taken (in time).

$\Delta t >> 1/(2*fs)$

For example: if $f_s$=100 Hz, measurements will need to be made every 0.005 sec, with the result that there will be 720,000 data points for the temperature.

With regard to process 3 above, background information is provided at http://www.astro.cornell.edu/~cordes/A6523/StochasticProcesses2015.pdf. Regarding process 5 above, background information concerning that process is provided at https://pdfs.semanticscholar.org/e633/45b4243e2376720a4e66373fdffe7a7d6be0.pdf Welch, P. (1967). *The Use of Fast Fourier Transformation for the Estimation of Power Spectra: A Method Based on Time Averaging Over Short, Modified Periodograms*. https://pdfs.semanticscholar.org/e633/45b4243e2376720a4e66373fdffe7a7d6be0.pdf Background information concerning Parsevals' theorem is provided at https://en.wikipedia.org/wiki/Parseval%27_s theorem. Background information concerning the Gaussian function referred to in process 7 above is provided at http://www.cse.yorku.ca/~kosta/CompVis_Notes/fourier_transform_Gaussian.pdf. Background information concerning Nyquist's theorem is provided at https://en.wikipedia.org/wiki/Nyquist%E2%80%93Shannon_sampling_theorem. All of the aforementioned documents and information are incorporated herein in their respective entireties by this reference.

D. OPTIMAL NUMBER OF DEVICES

As noted elsewhere herein, determination of an optimal number of devices may be important since there may be negative consequences associated with the use of too many, or too few, devices. For example, if there are not enough devices, then the "true measurement" of the sensors may not be accurately reflected. If there are too many devices, then the business may be wasting resources maintaining and powering these extra devices.

With particular reference now to FIG. 6, further information is provided concerning processes for determining an optimal number of devices. In general, these processes may involve the use of a space input function which may be derived using logic similar to that employed for the determination of the optimal polling frequency. Note that for assessment of this model, the continuity of the time function was assumed. As noted earlier, and indicated in FIG. 6, an optimal polling frequency 316 may, in combination with a distance array 318, be used as a basis for determining an optimal device count 320.

The distance measurements between devices and the ingest platform 306, which may be captured in the distance array 318, may be recorded based on the device coordinates or spatial orientation in a building, or other environment which may be two or three dimensional. This measure will consider positions of the devices relative to the characteristic that is being monitored in the space. Thus, in the example case where a heat source is being monitored, the respective distance(s) may be measured from the heat source and the sensors that will be placed in line along one of the walls, where the length of the wall will be λ, or devices, to the heat source.

Similar to the use of the Nyquist-Shannon-Katelnikov theorem for the determining frequency of sensors in time, the combination of the same functions will be used. The frequency will now be a frequency of sensors in the line, analogous to the way in which there is frequency of mileage markers along a highway. The combination of the two functions, that is, the measurement uncertainty of the sensors and the Fourier transform of average ensemble function for the temperature, will result in an optimal position of the sensors that would allow for the optimal update of the model with the optimized number of sensors. The optimal position may be derived as a product $f_s$ and λ. However, in this case $f_s$ is measured in distance between sensors. Therefore, λ is the product of the distance between the sensors, number of sensors and the frequency of sensors fs. The product will be a number of data points needed for the fidelity of the 2D model if this problem is being considered in 2D (XY coordinates). When considered from a 3D perspective, the model may be considered as comprising a volume with multiple sensors. The number of sensors for each dimension will be following the same process described above, but the total number of sensors will be a product of each of the components:

$n_x = \lambda_x * 2fs_x$ $n_y = \lambda_y * 2fs_y$ $N = n_x + n_y$

Where N is the number of signals or data points.

E. CALCULATING A DCF CONFIDENCE SCORE

Figure 8:
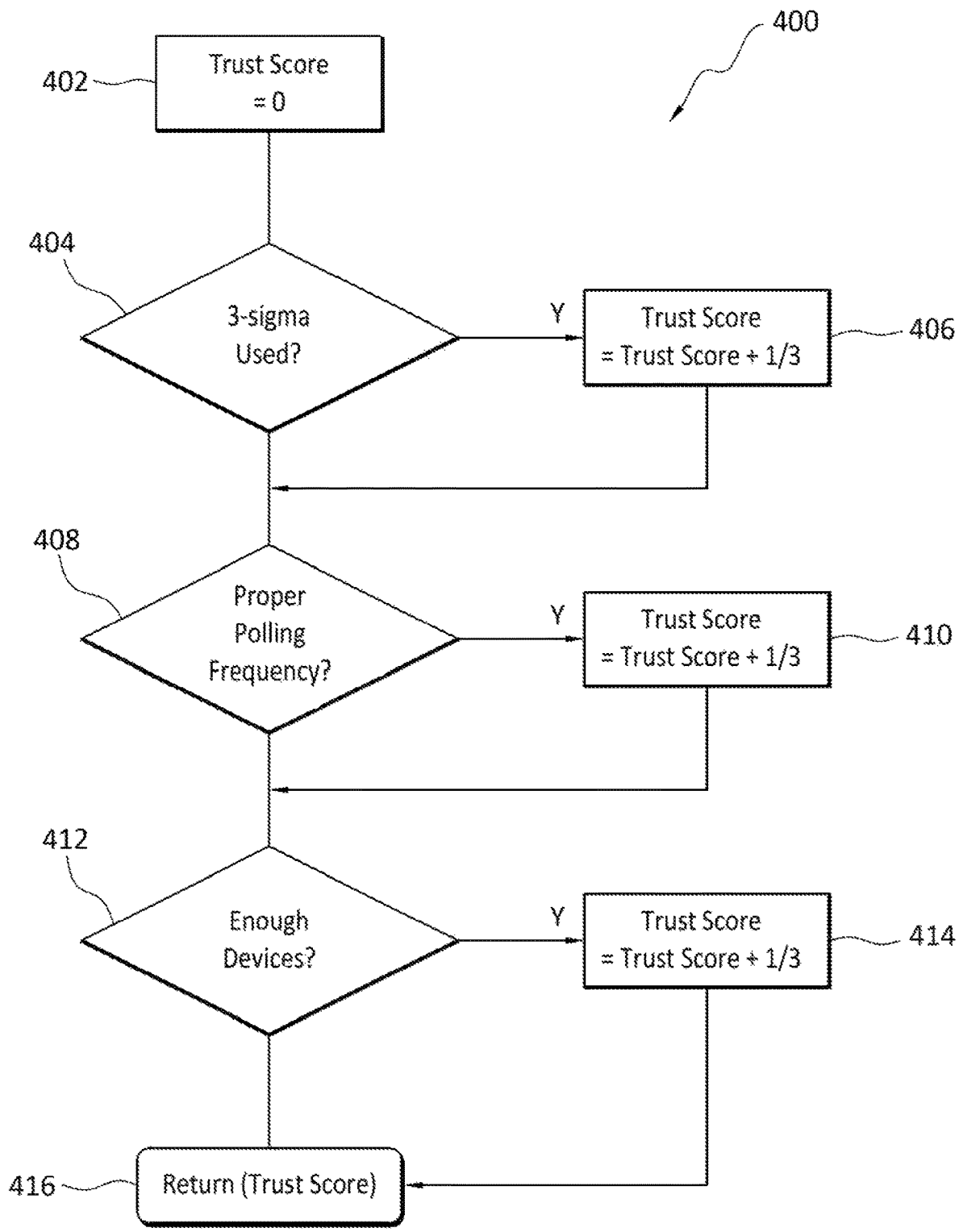
FIG. 8 discloses an example process for the use of trust insertion technologies.

With reference next to FIG. 8, details are provided concerning an example method, denoted generally at 400, for determining a DCF confidence score in an operating environment that may involve various devices that generate data concerning the operating environment and then transmit that data upstream for analysis and processing. The method 400 may be performed at any suitable site, such as at an ingest platform, or other collection site, for example. In some embodiments, the method 400 may be performed by software that comprises an element of an ingest platform. The scope of the invention is not limited to any particular site(s) for performance of the method 400 however.

More particularly, embodiments of the invention may be implemented in connection with a data confidence fabric, such that a "score" can be calculated that reflects the confidence that any given reading or set of readings reflects a "true measurement." Thus, FIG. 8 discloses a flowchart describing a "True Measurement" trust insertion component that may generate a trust score from 0 to 1 for a device reading, where 0 indicates untrusted/no confidence, and 1 indicates trusted/complete confidence. Any trust score from 0 to 1, inclusive, may be assigned to data generated by a device.

As shown in the example of FIG. 8, data from a device may be checked according to various trust insertion components (TIC), or measures, applied to the data. In this example, there are three measures that are applied serially to the data, but serial application of the measures is not necessarily required. Moreover, the order of application of the measures may be varied and need not necessarily be implemented as indicated in FIG. 8. Initially, the trust score may have a 0 default value. After each measure is applied to the data, the outcome of the application of the measure may result in a binary 'Y' or 'N' response that may be output concerning that measure. Where the output is negative, such as 'N' (no), the trust score may remain unchanged. Where the output is positive, such as 'Y' (yes), the trust score may be incremented upward some amount.

The incrementation amount may or may not be the same for each measure. In some embodiments, incrementation amounts may be differently weighted according to the relative importance of the measure applied to the data. That is, some measures may be deemed more important than others, and the incrementation amounts respectively associated with those measures may differ accordingly. In general, the sum total of the incrementation amounts may be a maximum of 1. In some embodiments, the method 400 may terminate even if all the measures have not yet been applied. For example, if application of the first two measures results in a trust score of 0.67, which exceeds an established threshold such as 0.6 for example, then it may not be necessary to apply any further measures since the data has met the trust score threshold.

With reference now to the particular example of FIG. 8, the method 400 may begin at 402 when a default trust score of 0 is assigned to a piece of data from a device. At 404, a determination is made as to whether or not a 3σ (3 sigma) evaluation has been made of the particular data, or reading for example. If so, and if the 3 sigma evaluation indicates that the data value falls within a 3 sigma range of values, the trust score of 0 may be incremented 406 by an amount, such as 0.33 in the example of FIG. 8. Thus, at 406, the trust score for the data becomes 0.33.

The method 400 may then advance to 408 where a determination is made as to whether or not the device from which the data originated is being polled at an optimum frequency or within an acceptable range of frequencies, such as about ±10% or about −10%, of the optimum frequency. Note that over-polling of the device may not be a concern as far as the trustworthiness of the device data, but as disclosed elsewhere herein, over-polling may result in various problems in some circumstances. On the other hand, under-polling of the device may implicate a relatively lower trust score for the device data than optimum polling. In the event that the polling frequency of the device that generated the data is determined 408 to be acceptable, the trust score of the data may be incremented 410, by about 0.33 in the example of FIG. 8. Since the trust score had a value of 0.33 at 408, the new trust score value becomes 0.67 at 410, at least so long as the six-sigma value was also favorable, that is, acceptable.

Next, with regard to the data being evaluated, a determination may be made 412 as to whether or not there is an optimum number of devices in the environment where the device that generated the data is located. Methods for determining an optimum number of devices are disclosed elsewhere herein. In some embodiments, there may be deemed to be enough devices in an environment when the number of devices is the optimum number or is within an acceptable range of the optimum number, such as about ±10% or about −10%, of the optimum number. As with polling frequency, a number of devices that is >than the optimum number may not present any concerns as far as trustworthiness of the data, but may result in problems in some circumstances. On the other hand, too few devices may implicate a relatively lower trust score for the device data than an optimum number of devices, or a number of devices within an acceptable range of optimum.

In the event that the number of devices in the environment is determined 412 to be acceptable, the trust score of the data may be incremented 414, by about 0.33 in the example of FIG. 8. Since the trust score had a value of 0.67 at 410, the new trust score value becomes 1.0 at 414.

Because the trust score of the data is at its maximum value of 1, the trust score may then be returned 416, such as to a user by way of a user interface (UI), and/or to a component of an ingest platform, for example. As well, the trust score may be stored at an ingest platform and/or other location(s). Further, the method 400 may end at 416, since the trust score for the data is at the maximum value of 1. As noted earlier, the method 400 may stop at 416 after the trust score has met or exceeded some threshold that is <1, even if all the measures have not been applied to the data yet.

As part of, or separately from, the method 400, the ingestion platform may generate an event or a notification that resources are being wasted. For example, if a determination is made at 408 that the device which generated the data being evaluated is being polled at a frequency that is greater, such as by about 10% or more for example, than an optimum frequency, the ingestion platform and/or other entity may generate a notification that the device is being polled more frequently than necessary. This notification may be sent to another entity and/or the ingestion platform may use this assessment as a trigger to modify the system configuration so that the polling of that device is reduced to, or near, the optimum frequency. In this way, labor and/or cost reductions associated with the device may be realized.

In a similar manner, the ingestion platform may determine that an excessive number of devices have been deployed in a particular environment, and may generate a corresponding notification. These processes may be performed separately from, or as part of, the method 400. For example, if a determination is made at 412 that an excessive number of devices has been deployed, such as about 10% or more than the optimum number of devices, for example, the ingestion platform and/or other entity may generate a notification to that effect. This notification may be sent to another entity, such as a user for example, to enable the entity to take action to reduce, such as by disabling and/or removing one or more excess devices, the number of devices in the environment that is being monitored. In this way, labor and/or cost reductions associated with the excess device(s) may be realized.

F. EXAMPLE METHODS

Figure 9:
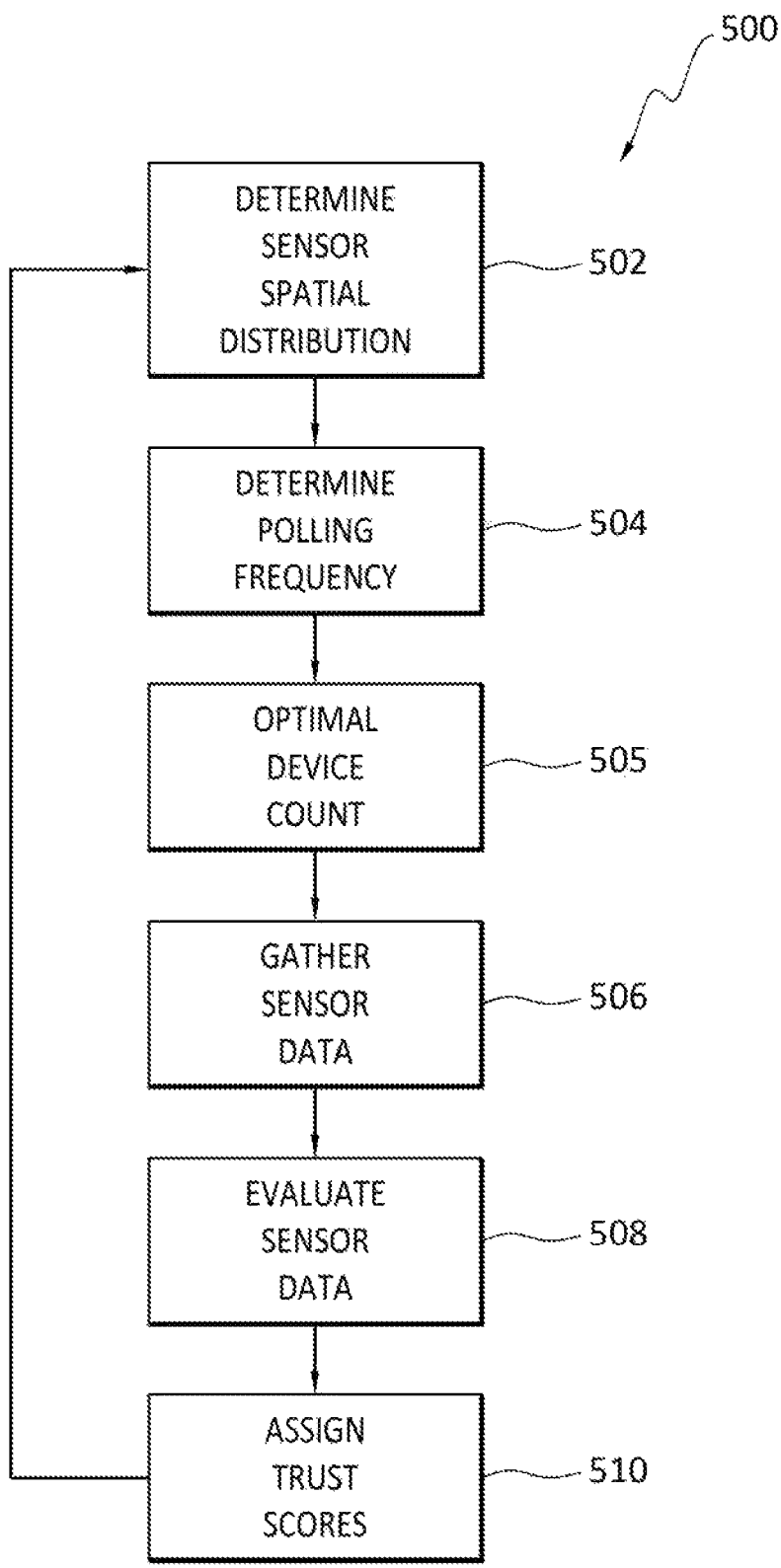
FIG. 9 discloses an example method for gathering, processing, and analyzing sensor data.

With reference now to FIG. 9, details are provided concerning methods for using temporal and spatial analytics in connection with data confidence assessments concerning data generated by one or more devices in an environment monitored by the devices. One example of such a method is denoted generally at 500. The method 500 may be performed in whole or in part by an ingestion platform, although that is not necessarily required. Part or all of the method 500 may be performed in connection with a physical environment that already includes a group of one or more devices, such as sensors for example.

In other embodiments, part or all of the method 500 may be performed with respect to a hypothetical environment. For example, such embodiments may be used to model a physical environment. In such other embodiments, values may be arbitrarily specified by a user or other entity for any one or more of device spatial distribution, the number of devices deployed, and a polling frequency. What-if analyses may then be performed using these arbitrary values. When a what-if analysis identifies a viable solution that meets any specified operating parameters, the solution may then be implemented in a physical environment, such as by installing an optimum number of devices, polling the devices at an optimum frequency, and then assigning trust scores to the data gathered as a result of the polling.

The example method 500 may begin with determination of a device spatial distribution 502 in a physical space, such as a three dimensional physical space or structure, in which each device may have an X-Y-Z coordinate, and a particular distance ($\lambda$) between the device and a particular portion of the physical space. In some embodiments, the monitored environment may be a two dimensional physical space or structure, such that the devices each have only an X-Y coordinate. As a result of the determination 502, a distance between each device and a physical device, in the physical space, that includes an ingestion platform may be captured. The distances from each device, which may be the shortest distance between a device and the physical device of the ingestion platform, can be measured with respect to any other reference point(s) in the space besides the physical device that hosts the ingestion platform.

Next, an optimum polling frequency may be determined 504 for any or all of the devices. Determination of the optimum polling frequency 504 may be based in part on one or more readings taken by each of the devices at one or more times T, and also based in part on measurement uncertainty information, which may be provided by a device manufacturer for example.

In some embodiments, an optimal device count determination 505 may be performed. The optimal device count determination 505 may be made using device distance information and polling frequency information. In other embodiments, the optimal device count determination 505 may be omitted, and it may still be possible to determine trust scores for data gathered by the devices, without using the optimal device count.

When an optimal number of devices have been deployed, and an optimal polling frequency determined, an ingestion platform or other collection point may begin to gather data 506 generated by the devices. The data may be stored at the collection point and/or other locations. The incoming data may then be evaluated 508 for trustworthiness, that is, the extent to which there is confidence that the data is accurate. In some embodiments, the incoming data may be evaluated 508 in-flight as it is streamed from the devices to the ingestion platform. In other embodiments, the data may be evaluated only after a data set of a desired size and/or composition has first been collected and stored.

Finally, evaluation of the data 508 may enable the assignment of trust scores 510 to the data. Trust scores may be determined, for example, by application of various measure or trust insertion components to the data. Depending upon the embodiment, trust scores may be assigned to individual device readings, at a device level, to a group of devices, to a particular time period, or to all deployed devices as a whole.

As shown in FIG. 9, any part, or all, of the method 500 may be performed recursively. Recursive performance may be implemented for various reasons, such as if conditions change in the monitored environment, devices are removed or installed, or if trust scores start to trend down for some reason.

G. FURTHER EXAMPLE EMBODIMENTS

Following are some further example embodiments of the invention. These are presented only by way of example and are not intended to limit the scope of the invention in any way.

Embodiment 1

A method, comprising: determining a spatial distribution of devices in a three dimensional physical environment; determining a polling frequency for each of the devices; receiving data generated by the devices; evaluating the data; and assigning a trust score to the data.

Embodiment 2

The method as recited in embodiment 1, wherein one or more of the devices comprises a sensor that is operable to sense, and report on, a physical attribute of the three dimensional physical environment.

Embodiment 3

The method as recited in any of embodiments 1-2, wherein determining a spatial distribution of the devices comprises determining a distance between each device and a particular point or area in the three dimensional physical environment.

Embodiment 4

The method as recited in any of embodiments 1-3, wherein the data is placed in an ensemble table, and the polling frequency is determined in part by applying a Fourier transform to a portion of the ensemble table.

Embodiment 5

The method as recited in embodiment 4, wherein the ensemble table includes, for one or more of the devices, a set of one or more readings taken by that device for each of a plurality of different times.

Embodiment 6

The method as recited in any of embodiments 1-5, further comprising determining an optimal device count based on the polling frequency and based on a distance array that includes information about the spatial distribution of the devices.

Embodiment 7

The method as recited in any of embodiments 1-6, wherein assignment of a trust score comprises applying one or more measures to the data, and for each applied measure, generating a value for the trust score between 0 and 1, and applying the trust score to the data.

Embodiment 8

The method as recited in embodiment 7, wherein the measures comprise any one or more of: a 3 sigma check; a polling frequency check; and, a device count check.

Embodiment 9

The method as recited in any of embodiments 1-8, further comprising issuing a notification if an excessive number of devices is determined to be present in the three dimensional physical environment and/or if the polling frequency is determined to be excessive.

Embodiment 10

The method as recited in any of embodiments 1-9, further comprising polling the devices at the polling frequency.

Embodiment 11

A method for performing any of the operations, methods, or processes, or any portion of any of these, disclosed herein.

Embodiment 12

A non-transitory storage medium having stored therein instructions that are executable by one or more hardware processors to perform the operations of any one or more of embodiments 1 through 11.

H. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
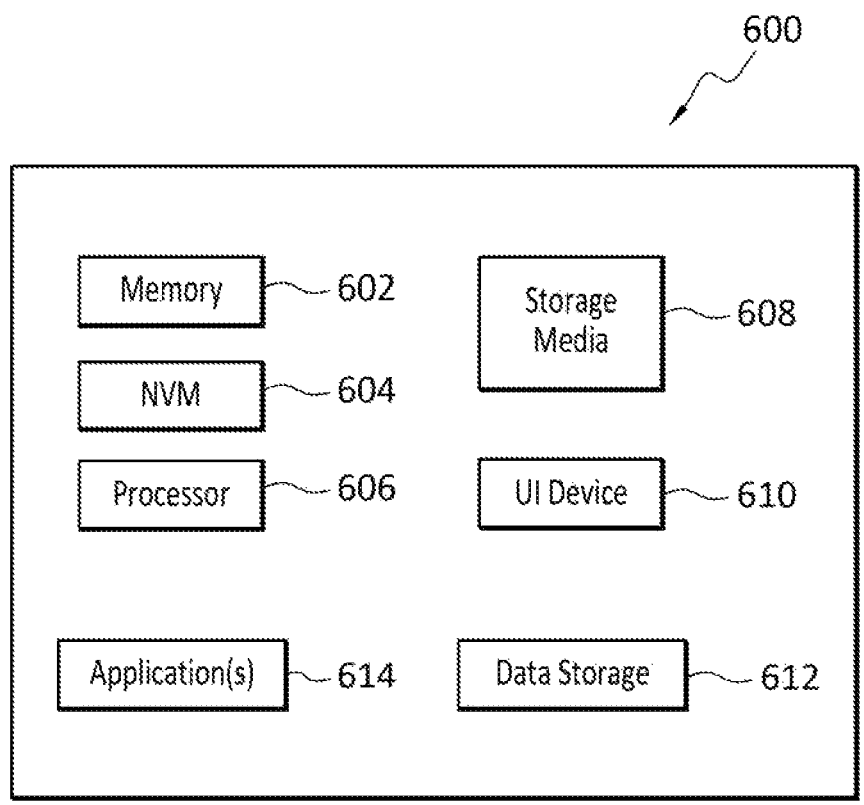
FIG. 10 discloses aspects of an example computing entity.

With reference briefly now to FIG. 10, any one or more of the entities disclosed, or implied, by FIGS. 1-9 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 10.

In the example of FIG. 10, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    determining a spatial distribution of devices in a three dimensional physical environment;
    determining a polling frequency for each of the devices;
    determining an optimal device count based on the polling frequency and based on a distance array of the devices indicating distances between the devices and a particular point or area in the three dimensional physical environment;
    receiving data generated by one of the devices based on at least the optimal device count, and the data comprises data about a non-spatial physical attribute of the three dimensional physical environment;
    evaluating the data; and
    assigning a final trust score to the data, wherein the final trust score is determined by applying one or more measures to the data and each applied measure is associated with a respective incrementation amount to be applied to a previous trust score value of the data.

2. The method as recited in claim 1, wherein one or more of the devices comprises a sensor that is operable to sense, and report on, the non-spatial physical attribute of the three dimensional physical environment, and the non-spatial physical attribute comprises one of: temperature; pressure; humidity; light; odor; or sound.

3. The method as recited in claim 1, wherein the data is placed in an ensemble table, and the polling frequency is determined in part by applying a Fourier transform to a portion of the ensemble table.

4. The method as recited in claim 3, wherein the ensemble table includes, for one or more of the devices, a set of one or more readings taken by that device for each of a plurality of different times.

5. The method as recited in claim 1, wherein assignment of the final trust score comprises for each applied measure, generating a value for the previous trust score value between 0 and 1.

6. The method as recited in claim 5, wherein the measures comprise any one or more of: a 3 sigma check; a polling frequency check; and, a device count check.

7. The method as recited in claim 1, further comprising issuing a notification if an excessive number of devices is determined to be present in the three dimensional physical environment and/or if the polling frequency is determined to be excessive.

8. The method as recited in claim 1, further comprising polling the devices at the polling frequency.

9. A non-transitory storage medium having stored therein instructions that are executable by one or more hardware processors to perform operations comprising:

determining a spatial distribution of devices in a three dimensional physical environment;

determining a polling frequency for each of the devices;

determining an optimal device count based on the polling frequency and based on a distance array of the devices indicating distances between the devices and a particular point or area in the three dimensional physical environment;

receiving data generated by one of the devices based on at least the optimal device count, and the data comprises data about a non-spatial physical attribute of the three dimensional physical environment;

evaluating the data; and assigning a final trust score to the data, wherein the final trust score is determined by applying one or more measures to the data and each applied measure is associated with a respective incrementation amount to be applied to a previous trust score value of the data.

10. The non-transitory storage medium as recited in claim 9, wherein one or more of the devices comprises a sensor that is operable to sense, and report on, the non-spatial physical attribute of the three dimensional physical environment, and the non-spatial physical attribute comprises one of: temperature; pressure; humidity; light; odor; or sound.

11. The non-transitory storage medium as recited in claim 9, wherein the data is placed in an ensemble table, and the polling frequency is determined in part by applying a Fourier transform to a portion of the ensemble table.

12. The non-transitory storage medium as recited in claim 11, wherein the ensemble table includes, for one or more of the devices, a set of one or more readings taken by that device for each of a plurality of different times.

13. The non-transitory storage medium as recited in claim 9, wherein assignment of the final trust score comprises for each applied measure, generating a value for the previous trust score value between 0 and 1.

14. The non-transitory storage medium as recited in claim 13, wherein the measures comprise any one or more of: a 3 sigma check; a polling frequency check; and, a device count check.

15. The non-transitory storage medium as recited in claim 9, wherein the operations further comprise issuing a notification if a number of devices present in the three dimensional physical environment is determined to be less than an optimal number and/or if the polling frequency is determined to fall below an optimum frequency.

16. The non-transitory storage medium as recited in claim 9, wherein the operations further comprising polling the devices at the polling frequency.

* * * * *